(12) United States Patent
Libby et al.

(10) Patent No.: US 7,109,959 B2
(45) Date of Patent: Sep. 19, 2006

(54) MULTI-TASK WINDOW

(75) Inventors: James Brian Libby, Stillwater, MN (US); Rodney Kieth Williams, Stacy, MN (US); Oscar E. Pena A., London (GB); Alex W. K. Tan, Eindhoven (NL)

(73) Assignee: Andersen Corporation, Bayport, MN (US)

( * ) Notice: Subject to any disclaimer, the term of this patent is extended or adjusted under 35 U.S.C. 154(b) by 52 days.

(21) Appl. No.: 10/068,686

(22) Filed: Feb. 6, 2002

(65) Prior Publication Data

US 2003/0146889 A1 Aug. 7, 2003

(51) Int. Cl.
*G09G 3/36* (2006.01)

(52) U.S. Cl. .............. 345/87; 348/794; 40/789

(58) Field of Classification Search .......... 345/87, 345/905; 348/794; 40/789; 49/413
See application file for complete search history.

(56) References Cited

U.S. PATENT DOCUMENTS

| | | | |
|---|---|---|---|
| 3,801,943 A | 4/1974 | Bertagni | |
| 3,861,444 A * | 1/1975 | Portwood | 160/90 |
| 3,896,589 A * | 7/1975 | Mitchell | 49/425 |
| 4,434,579 A | 3/1984 | Murphy | 49/63 |
| 4,561,619 A | 12/1985 | Robillard et al. | |
| 4,735,467 A | 4/1988 | Wolters | |
| 4,836,478 A | 6/1989 | Sweere | |
| 4,926,486 A | 5/1990 | Barsumian | |
| 5,007,707 A | 4/1991 | Bertagni | |
| 5,253,051 A * | 10/1993 | McManigal | 348/121 |
| 5,374,104 A | 12/1994 | Moore et al. | |
| 5,400,414 A | 3/1995 | Thiele | |
| 5,538,310 A | 7/1996 | Frankhouse et al. | |
| 5,687,939 A | 11/1997 | Moscovitch | |
| 5,701,359 A | 12/1997 | Guenther et al. | |
| 5,732,919 A | 3/1998 | Rosen et al. | |
| 5,793,877 A | 8/1998 | Tagg | |
| 5,941,488 A | 8/1999 | Rosen | |
| 6,007,036 A | 12/1999 | Rosen | |
| D418,831 S | 1/2000 | Rosen et al. | |
| 6,144,417 A * | 11/2000 | Yanagisawa | 348/823 |
| 6,160,898 A | 12/2000 | Bachmann et al. | |
| 6,189,849 B1 | 2/2001 | Sweere et al. | |
| 6,275,598 B1 | 8/2001 | Bachmann et al. | |
| 6,286,794 B1 | 9/2001 | Harbin | |
| 6,347,149 B1 | 2/2002 | Bachmann et al. | |
| 6,352,226 B1 | 3/2002 | Gordon | |
| 6,373,215 B1 | 4/2002 | Grabmaier et al. | |
| 6,388,404 B1 | 5/2002 | Schnebly et al. | |
| 6,389,935 B1 | 5/2002 | Azima et al. | |
| 6,397,504 B1 | 6/2002 | McFetridge | |
| 6,397,972 B1 | 6/2002 | Bank et al. | |
| 6,407,468 B1 | 6/2002 | LeVesque et al. | |
| D460,055 S | 7/2002 | Rosen | |

FOREIGN PATENT DOCUMENTS

| | | |
|---|---|---|
| DE | 201 13 157 U1 | 1/2002 |
| FR | 2 434 540 | 4/1980 |
| WO | WO 00/02417 | 1/2000 |

\* cited by examiner

*Primary Examiner*—Jimmy H. Nguyen
(74) *Attorney, Agent, or Firm*—Womble Carlyle Sandridge & Rice, PLLC

(57) ABSTRACT

A window unit that includes a window frame defining a frame perimeter and a window located within the frame perimeter. The window includes a display module adapted to receive a display signal from a display signal source.

16 Claims, 1 Drawing Sheet

MULTI-TASK WINDOW

BACKGROUND OF THE INVENTION

The invention generally relates to a window unit that provides a display module adapted to receive a display signal from a display signal source.

SUMMARY OF THE INVENTION

In accordance with the present invention, there is provided a window unit that includes a window frame defining a frame perimeter and a window located within the frame perimeter. The window includes a display module adapted to receive a display signal from a display signal source.

Also in accordance with the present invention, there is provided a method that includes providing a window frame defining a frame perimeter and providing a window within the frame perimeter. The window includes a display module adapted to receive a display signal from a display signal source.

DETAILED DESCRIPTION OF THE PREFERRED EMBODIMENT

Figure 1:
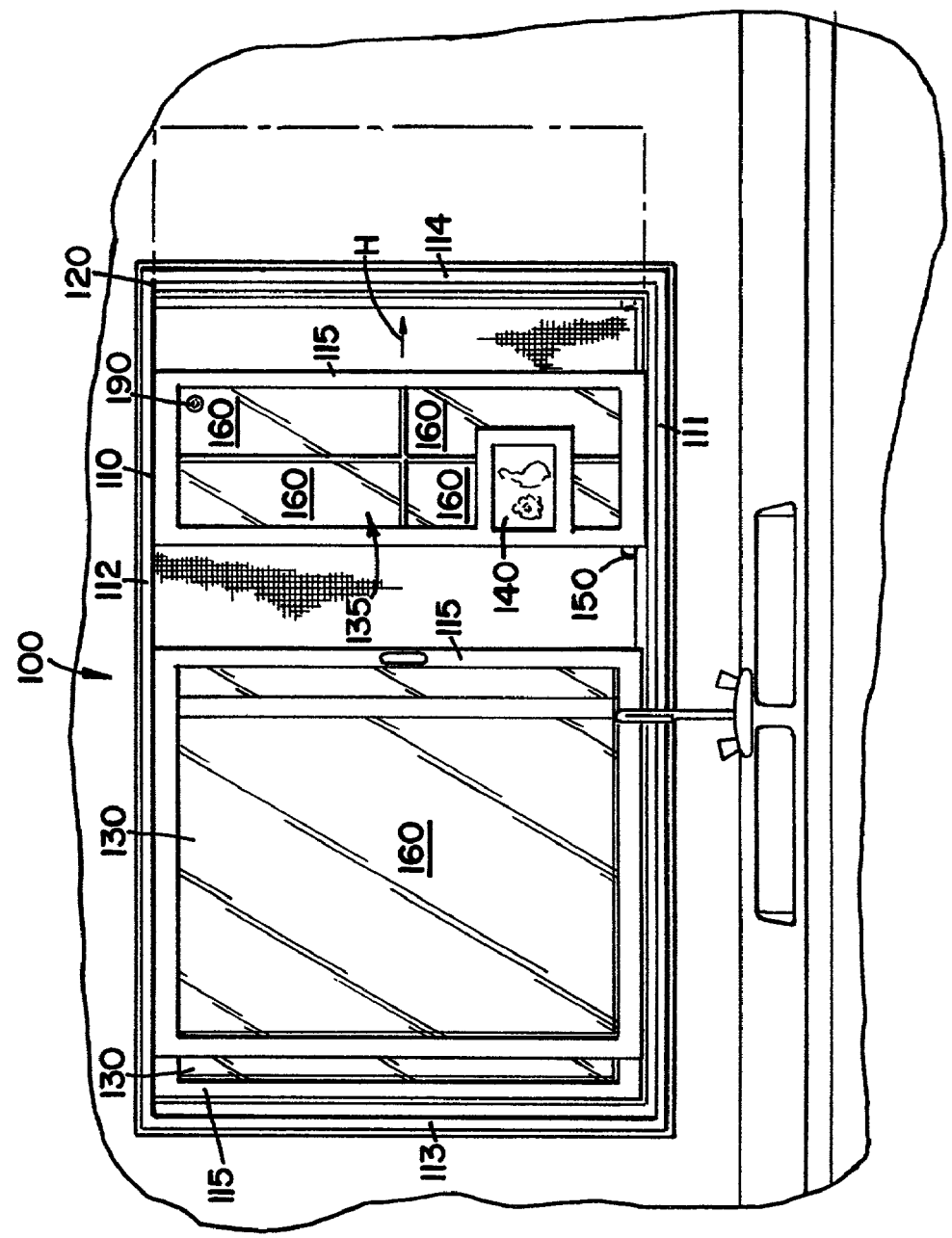
FIG. 1 is a prospective view of a window unit in accordance with the invention.

FIG. 1 is a prospective view of a window unit in accordance with the invention. The window unit 100 includes a window frame 110. The window frame 110 defines a window frame perimeter 120. A window 130, 135 is located within the frame perimeter 120. The window frame 110 may include a sash frame, a casement frame or a frame surrounding window glass or sash frame or casement frame.

The window frame 110 may include two pair of opposed frame members. A first pair of opposed frame members includes a bottom frame member 111 and a top frame member 112 can be oriented along a horizontal rigid frame axis. A second pair of opposed rigid frame members includes a first side frame member 113 and a second side frame member 114 can be oriented along a vertical frame axis. The four frame members 111, 112, 113, 114 can generally form a square or rectangle shape. However, the window frame may be any shape.

The window unit 100 may be, for example, an opening in a wall or building for admission of light and air that may be closed by casements or sashes containing transparent, translucent or opaque material and may be capable of being opened or closed, such as, for example, a picture window, a bay window, a double-hung window, a skylight, egress window, an awning window, a casement window, a gliding window, and the like.

The window 130, 135 can include a display module 140 adapted to receive a display signal from a display signal source (not shown). The display module 140 provides a visual display observable by a user. The display module 140 may be, for example, a liquid crystal display, a plasma display, a CRT display, and the like.

The display signal may be a digital signal, an analog signal, a digital and analog signal, and the like. The display signal source (not shown) may be, for example, a VCR, DVD, computer, camera, and the like.

The window unit 100 may include a one or more windows, such as, for example, sashes, casements, fixed panes, a combination of sashes, casements and fixed panes, and the like. FIG. 1 illustrates a non-limiting example of a window unit 100 with three sash windows 130, 135. The sash window 130, 135 is shown with a frame 115 enclosing glass 160. However, the window 130, 135 may include glass 160 without the frame 115.

Two sash windows 130 are larger than the third sash window 135. The two larger sash windows 130 are sufficient to close the window unit 100. The third sash window 135 includes the display module 140. The third sash window 135 maybe in contact with the first pair of opposing frame members that includes a bottom frame member 111 and a top frame member 112 oriented parallel to a horizontal window unit axis H. The third sash window 135 may move along the horizontal window unit axis H between the second pair of opposing rigid frame members that includes a first side frame member 113 and a second side frame member 114. The third sash window 135 may move along the horizontal window unit axis H between and extend beyond the second pair of opposing rigid frame members 113, 114 forming vertical sides of the frame perimeter 120. A portion of or substantially the entire third sash window 135 may extend beyond the frame perimeter 120. When substantially the entire third sash window 135 extends beyond the frame perimeter 120, an unobstructed view is provided through the windows 130.

The window 135 may include a tab 150 that remains within the frame paimeter 120 when substantially the entire window 135 extends beyond the frame perimeter 120. The tab 150 may be a protrusion extending from the window 135. The tab 10 provides the user a convenient grasping device to move the window 135, especially when the window 135 extends beyond the frame perimeter 130. The tab 150 also minimizes visual obstruction through the window unit 100 to the user when the window extends beyond the frame perimeter 120.

The window unit 100 may also include a speaker element 190. The speaker element 190 can produce sound in response to an audio signal. The audio signal may be an analog signal, a digital signal or an analog and digital signal, and the like. The speaker element 190 can be located on or within the window 135, 130. The speaker element 190 may operate in cooperation with the display module 140 to provide sound for the display images.

A window unit 100 may be constructed by providing a window frame 110 defining a frame perimeter 120 and providing a window 130 located within the frame perimeter 120. The window includes a display module adapted to receive a display signal from a display signal source.

We claim:

1. A window unit comprising:
   a window frame disposed in the wall of a structure;
   a multi-task window slidably mounted in the window frame;
   the multi-task window comprises a display module for receiving a display signal and a window pane that permits viewing through the wall of the structure; wherein:
   the multi-task window is capable of being moved along a horizontal window unit axis until at least a portion of the multi-task window and at least a portion of said display module extend beyond the frame perimeter.

2. The window unit of claim 1 wherein the display module is a liquid crystal display.

3. The window unit of claim 1 wherein the multi-task window includes a tab that remains within the frame perimeter when at least a portion of the window extends beyond the frame perimeter.

4. The window unit of claim 1 wherein the display module is capable of receiving at least one of a digital display signal and an analog display signal.

5. The window unit of claim 1, wherein the display module and the window pane are housed in separate sashes.

6. The window unit of claim 1, wherein the multi-task window is disposed in the frame in front of a base window that allows viewing through the wall of the structure.

7. The window unit of claim 6, wherein the base window is capable of forming an opening in the wall.

8. The window unit of claim 1, wherein the multi-task window is movable along the window frame.

9. The window unit of claim 8, wherein a portion of the multi-task window is receivable into the wall adjacent the frame.

10. The window unit of claim 8, wherein the multi-task window is slidable into the wall adjacent the frame to allow viewing through the additional window that is unobstructed by the multi-task window.

11. The window unit of claim 10, wherein a tab is disposed on the multi-task window and protrudes into the frame when most, but not all, of the multi-task window is received into the adjacent wall.

12. The window unit of claim 11, wherein the tab provides a grasping means to move the multi-task window into, or out of, the adjacent wall.

13. The window unit of claim 1, wherein the display signal is a digital or analog signal received from a remote source.

14. The window unit of claim 1, further comprising a speaker element located on, or within, the frame.

15. A window unit comprising:

a window frame disposed in a wall of a structure;

a first window housed in a first sash and a second window housed in a second sash, the first window being movable within the window frame, and the second window being movable within the window frame and being receivable into the wall adjacent the window frame;

wherein the second window includes a display capable of displaying an image from a display source, said display received into said wall when the second window is received into said wall.

16. The window unit of claim 15, wherein most, but not all, of the second sash is receivable into the wall adjacent the window frame.

\* \* \* \* \*